United States Patent [19]

Kamino

[11] 4,379,500
[45] Apr. 12, 1983

[54] PARKING BRAKE CABLE ADJUSTING DEVICE

[75] Inventor: Kyoichi Kamino, Fujisawa, Japan

[73] Assignee: Nissan Motor Co., Ltd., Yokohama, Japan

[21] Appl. No.: 244,345

[22] Filed: Mar. 17, 1981

[30] Foreign Application Priority Data

Mar. 25, 1980 [JP] Japan .............................. 55-39778[U]

[51] Int. Cl.³ .......................................... F16D 65/54
[52] U.S. Cl. ................................................ 188/196 B
[58] Field of Search .......... 188/79.5 R, 196 R, 196 C, 188/196 F, 196 B, 196 V

[56] References Cited

U.S. PATENT DOCUMENTS 2,918,991 12/1959 Reisch .............................. 188/196 B
3,333,660 8/1967 Swift .................................. 188/196 B

FOREIGN PATENT DOCUMENTS 499379 6/1930 Fed. Rep. of Germany .
1012835 7/1957 Fed. Rep. of Germany .

Primary Examiner—Duane A. Reger
Attorney, Agent, or Firm—Thompson, Birch, Gauthier & Samuels

[57] ABSTRACT

A parking brake cable adjusting device having a brake lever, an actuating cable connected to a brake-operating mechanism, a control cable interconnecting the brake lever and the actuating cable, and a ratchet mechanism interconnecting a first end section of the control cable and the brake lever in a manner to permit the control cable first end section to advance in one axial direction relative to the brake lever in a manner to take up any slack in the cables.

4 Claims, 4 Drawing Figures

PARKING BRAKE CABLE ADJUSTING DEVICE

BACKGROUND OF THE INVENTION

1. Field of the Invention

The present invention relates in general to automobile parking brakes and more particularly to parking brake cable adjusting devices for taking up any slack in the parking brake cables.

2. Description of the Prior Art

In FIG. 1, a typical parking brake cable adjusting device is shown which comprises a brake lever 10 which is pivotally mounted at 12 on a bracket 14 which is in turn mounted on a floor panel 16 of a vehicle body. A front cable 18 has a threaded end section 20 attached to an end of the brake lever 10 by means of an adjusting nut 22 and a locknut 24. The front cable 18 extends through a sheath 26 into a space under the floor panel 16 and terminates at an end attached to an adjuster 28 having a nut 30 welded thereto. To the adjuster a threaded end of a rear cable 32 is screwed and secured thereto by means of a locknut 34. The other end of the rear cable 32 is connected to a brake-operating mechanism of a rear brake, though not shown in the drawing.

In the above structure, the parking brake cables 18 and 32 may stretch after a period of time, and if so they are adjusted to take up excess play of the brake lever 10. To carry out the adjustment, the locknut 24 or 34 is slackened and the adjusting nut 22 or the adjuster 28 is tightened until all free play is taken out of the cables. The locknut 24 or 34 is then tightened.

The parking brake cable adjusting device described as above is disadvantageous since frequent manual adjustment is required to keep the brake lever free of excess play and further since the frequent adjustment inevitably requires much time and cost.

SUMMARY OF THE INVENTION

In accordance with the present invention, there is provided an improved and novel parking brake cable adjusting device which comprises a brake lever, an actuating cable connected to a brake-operating mechanism, a control cable interconnecting the brake lever and the actuating cable, and a ratchet mechanism interconnecting a first end section of the control cable and either the brake lever or the actuating cable in a manner to permit the control cable first end section to advance in one axial direction relative to the brake lever or the actuating cable connected thereto in a manner to take up any slack in the cables.

The above structure operates to automatically take up any slack in the cables and therefore to keep the brake lever free of excess play.

It is accordingly an object of the present invention to provide an improved and novel parking brake cable adjusting device which is constructed to automatically take up any slack in the cables and therefore to keep the brake lever free of excess play.

BRIEF DESCRIPTION OF THE DRAWINGS

The features and advantages of the parking brake cable adjusting device according to the present invention will become more clearly appreciated from the following description in conjunction with the accompanying drawings, in which.

DESCRIPTION OF THE PREFERRED EMBODIMENT

Figure 1:
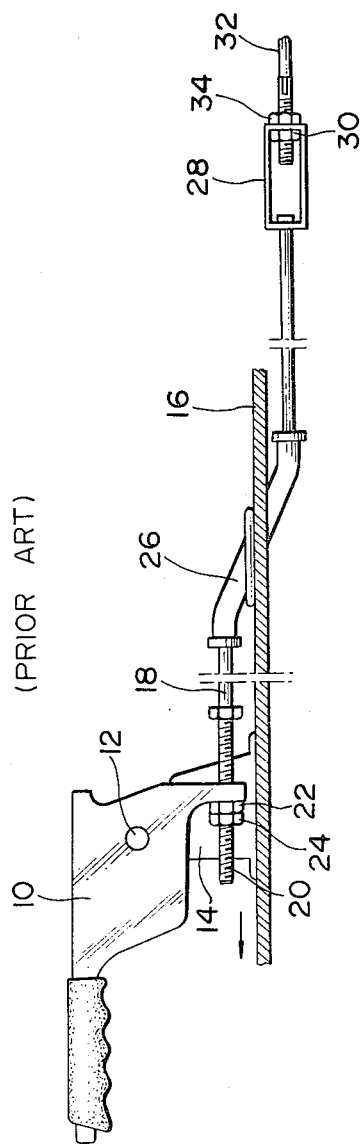
FIG. 1 is a side elevation of a prior art parking brake cable adjusting device with which the present invention is concerned.
Figure 2:
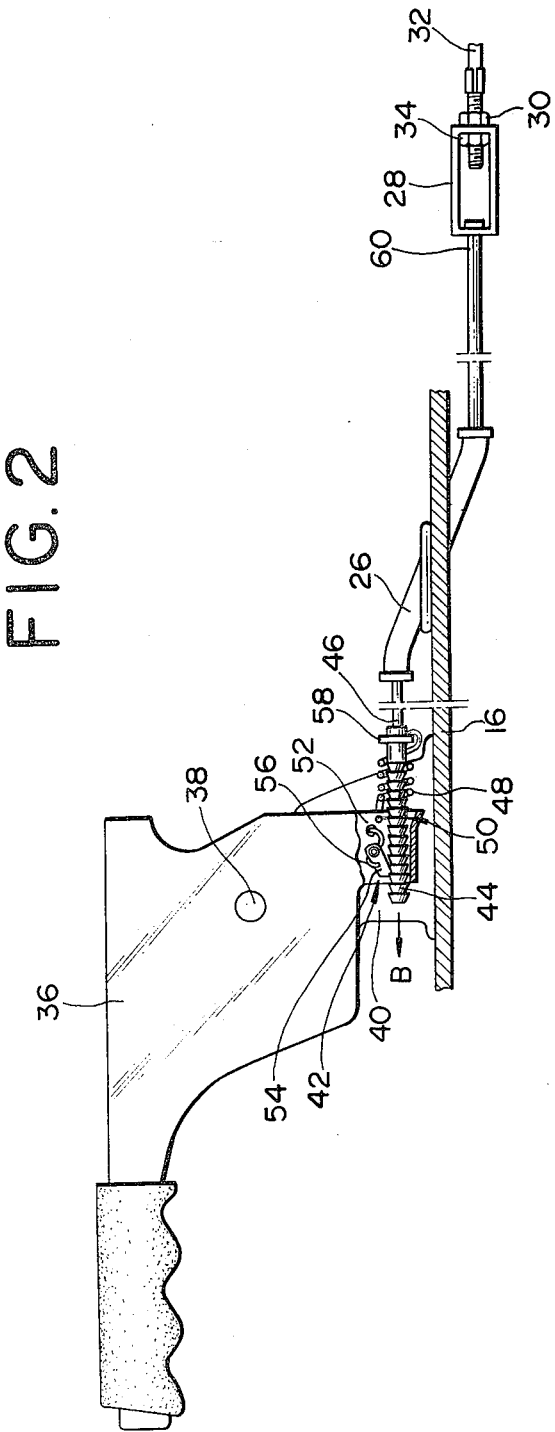
FIG. 2 is a side elevation of a parking brake cable adjusting device according to a first embodiment of the present invention.
Figure 3:
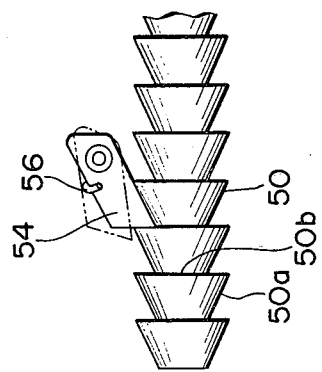
FIG. 3 is an enlarged, fragmentary view of a ratchet mechanism employed in the parking brake cable adjusting device of this invention.

Referring first to FIGS. 2 and 3, in which like elements to those of FIG. 1 are designated by like reference numerals, a parking brake cable adjusting device according to the first embodiment of the present invention is shown to comprise a brake lever 36 which is pivotally mounted at 38 on a bracket 40. The bracket is fixedly attached to a floor panel 16 of a vehicle body.

A ratchet mechanism 42 interconnects the brake lever 36 and a first end section 44 of a front or control cable 46 in a manner to permit the control cable first end section 44 to advance in one axial direction, i.e., in the direction of the arrow "B" relative to the brake lever 36. A tension spring 48 is disposed so as to urge the control cable first end section 44 relative to the brake lever in the direction of the arrow "B".

More specifically, the ratchet mechanism 42 comprises a series of ratchet teeth 50 formed on the control cable first end section 44 along the axis thereof. The ratchet teeth 50 are preferably in the form of a plurality of uniform truncated cones which are arranged successively along the axis of the control cable first end section 44 and each includes a conical surface 50a and an end surface 50b, as best shown in FIG. 3. The brake lever 36 has at the lower end thereof an opening 52 into which the toothed control cable first end section 44 is inserted and is axially movable therewithin. A pawl 54 is disposed within the opening 52 and is pivotally mounted on the brake lever 36 in a manner to releasably engage one of the ratchet teeth 50, that is, in a manner to permit the movement of the control cable first end section 44 in one axial direction (arrow B) thereof relative to the brake lever 36 but to prevent the movement in the opposite direction. The pawl 54 is urged by a pawl spring 56 in the counterclockwise direction in the drawing, i.e., in the direction to engage the ratchet teeth 50. The control cable first end section 44 is urged in the direction of the arrow "B" by the tension spring 48 whose ends are respectively attached to the brake lever 35 and a flange 58 provided on the control cable 46 at a location adjacent the end section 44.

The control cable 46 has a second end 60 connected to a rear or actuating cable 32 by means of an adjuster 28. On the other hand, the actuating cable 32 has a rear end connected to a brake-operating mechanism of a rear brake, though not shown in the drawing.

With the above structure, any slack in the cables 32 and 46 and therefore any excess play in the brake lever 36 is automatically taken up. That is, if the parking brake cables stretch and excess play of the brake lever results, the parking brake cables are put into a slackened condition when the brake lever is released or returned to its "OFF" position shown in FIG. 2. The pawl 54 is driven by the ratchet tooth conical surface 50a and put into a disengaged position as shown by the phantom line in FIG. 3. The control cable first end 44 is thus allowed to advance in the direction of the arrow "B" relative to the brake lever 36 until all free play is taken out of the cables and then the pawl 54 is brought into engagement with a new ratchet tooth under the bias of the pawl spring 56.

When the brake lever 36 is turned from its "OFF" position to its "ON" position to apply the brake, the brake lever is thus enabled to pull the parking brake cables 32 and 46 to apply the brake with the new engagement between the pawl 54 and the new ratchet tooth.

Figure 4:
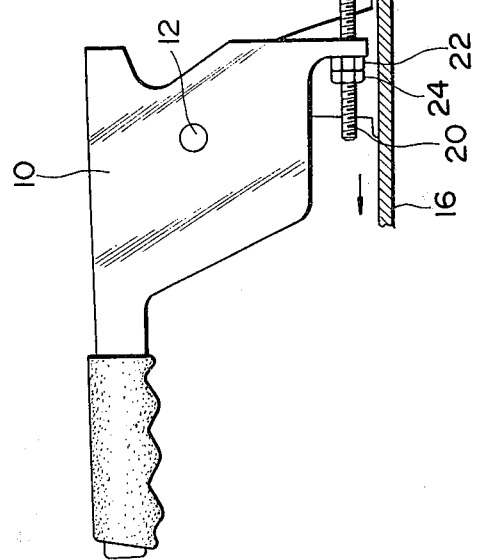
FIG. 4 is a side elevation of a parking brake cable adjusting device according to a second embodiment of the present invention.

Referring to FIG. 4, in which like elements to those of FIG. 1 are designated by like reference numerals, a parking brake cable adjusting device according to a second embodiment of this invention is shown to comprise a ratchet mechanism 62 which interconnects a first end section 64 of a control cable 18 and an actuating cable 66 in a manner to permit the control cable first end section 64 to advance in one axial direction, i.e., in the direction of the arrow "C" relative to the actuating cable 66. A compression spring 68 is disposed so as to urge the control cable first end section 64 relative to the actuating cable 66 in the direction of the arrow "C".

More specifically, the ratchet mechanism 62 comprises a series of ratchet teeth 70 formed on a front end section 72 of the actuating cable 66 along the axis thereof. The ratchet teeth 70 are in a form similar to the teeth of the first embodiment. The toothed actuating cable end section 72 is movably received within a casing 74 and has at the terminal end thereof an integral flange 76. The casing 74 is preferably in the form of a hollow cylinder and has an end wall 78 and an inward flange 80 at an intermediate section thereof. The control cable first end section 64 is provided with a flange 81 which is disposed within the casing 74 in a manner to abuttingly engage the inner face of the casing end wall 78, so that the control cable first end is movable together with the casing. A pawl 82 is disposed within the casing 74 and is pivotally mounted thereon in a manner to releasably engage the ratchet teeth 70, i.e., in a manner to permit the movement of the control cable first end section 64 in one axial direction (arrow C) thereof relative to the actuating cable 66 but to prevent the movement in the opposite direction. The pawl 82 is urged by a pawl spring 84 in the counterclockwise direction in the drawing, i.e., in the direction to engage the ratchet teeth 70. The control cable first end section 64 is urged in the direction of the arrow "C" by the compression spring 68 which is interposed between the actuating cable end flange 76 and the casing inward flange 80.

The control cable 18 has a second end 20 attached to an end of the brake lever 10 by means of an adjusting nut 22 and a locknut 24. On the other hand, the actuating cable 66 has a rear end connected to a brake-operating mechanism of a rear brake, though not shown in the drawing.

With the foregoing structure, the second embodiment of this invention can produce substantially the same effect as the first embodiment of FIG. 2.

Obviously, many variations and modifications of the present invention are possible in light of the above teachings. It is, therefore, to be understood that within the scope of the appended claims, the invention may be practiced otherwise than as specifically described.

What is claimed is:

1. A parking brake cable adjusting device comprising:
   a brake lever;
   a control cable interconnecting said brake lever and a brake-operating mechanism;
   a ratchet mechanism interconnecting a first end section of said control cable and said brake lever and permitting said control cable first end section to advance in one axial direction relative to said brake lever thereby taking up any slack in said control cable; and
   biasing means for urging said control cable first end section in said one axial direction;
   said ratchet mechanism including a series of ratchet teeth formed on said control cable first end section along the axis thereof and a pawl pivotally mounted on said brake lever in a position to engage said ratchet teeth;
   said control cable having a flange mounted thereon at a location adjacent said control cable first end section, said biasing means including a tension spring whose ends are respectively attached to said brake lever and said control cable flange.

2. A parking brake cable adjusting device as set forth in claim 1, wherein said brake lever has at a lower end thereof an opening within which said control cable first end section is movably received, and said pawl is also disposed within said opening.

3. A parking brake cable adjusting device as set forth in claim 1, wherein said ratchet teeth are in the form of a plurality of uniform truncated cones which are arranged successively along the axis of said control cable first end section.

4. A parking brake cable adjusting device as set forth in claim 1, wherein said ratchet mechanism further includes a pawl spring which urges said pawl in a direction to engage said ratchet teeth.

* * * * *